United States Patent [19]
Dropps et al.

[11] Patent Number: 5,296,795
[45] Date of Patent: Mar. 22, 1994

[54] METHOD AND APPARATUS FOR STARTING CAPACITIVE START, INDUCTION RUN AND CAPACITIVE START, CAPACITIVE RUN ELECTRIC MOTORS

[75] Inventors: Kevin J. Dropps, Berkley, Mass.; Herbert A. Thompson, Cumberland, R.I.; James Alvernaz, West Warwick, R.I.; Robert H. Fugere, North Providence, R.I.

[73] Assignee: Texas Instruments Incorporated, Dallas, Tex.

[21] Appl. No.: 966,768

[22] Filed: Oct. 26, 1992

[51] Int. Cl.$^5$ .......................... H02P 1/42; H02P 1/44
[52] U.S. Cl. .................... 318/778; 318/779; 318/786
[58] Field of Search .................. 318/770-790, 318/800-832

[56] References Cited

U.S. PATENT DOCUMENTS

| | | | |
|---|---|---|---|
| 4,382,217 | 5/1983 | Horner et al. | 318/778 |
| 4,395,671 | 7/1983 | Sandler et al. | 318/786 |
| 4,401,933 | 8/1983 | Davy et al. | 318/778 |
| 4,409,532 | 10/1983 | Hollenbeck et al. | 318/749 |
| 4,453,118 | 6/1984 | Phillips et al. | 318/779 |
| 4,604,563 | 8/1986 | Min | 318/786 |
| 4,622,506 | 11/1986 | Shemanske et al. | |
| 4,670,697 | 6/1987 | Wrege et al. | |
| 4,751,449 | 6/1988 | Chmiel | |
| 4,751,450 | 6/1988 | Lorenz et al. | |
| 4,782,278 | 11/1988 | Bossi et al. | |
| 4,804,901 | 2/1989 | Pertessis et al. | 318/786 |
| 4,862,053 | 8/1989 | Jordan et al. | 318/786 |

Primary Examiner—Paul Ip
Attorney, Agent, or Firm—Russell E. Baumann; Richard L. Donaldson; Rene' E. Grossman

[57] ABSTRACT

A solid state starting system for electric motors having main and auxiliary windings of the capacitor start induction run and capacitor start-capacitor run types uses a triac serially connected to the auxiliary winding. The system differentially measures the auxiliary winding voltage and provides a triac gate signal when in the START mode. When the auxiliary voltage reaches a calibratable cut-out voltage the triac is disabled until the auxiliary winding voltage decreases to a level below a calibratable cut-in voltage. The slope of the percent motor speed cut-out versus percent line voltage is calibratable to permit compensation for variations in line voltage. The triac can be directly driven or driven through an optically coupled interface having a triac output (OCI).

15 Claims, 3 Drawing Sheets

METHOD AND APPARATUS FOR STARTING CAPACITIVE START, INDUCTION RUN AND CAPACITIVE START, CAPACITIVE RUN ELECTRIC MOTORS

This invention relates generally to starting single phase AC induction electric motors and more specifically to starting motors such as capacitor start induction run (CSIR), capacitor start-capacitor run (CSCR) motors using solid state apparatus and techniques.

Such motors conventionally have been started using electromechanical relays or centrifugal switches. These devices are generally effective and are of relatively low cost but they suffer from certain inherent limitations. For example, since these devices have moving parts their longevity is limited thereby. Further, they are generally susceptible to being affected by dirt and chemical substances which may happen to be in their environment and they may also be sensitive to vibration and position orientation and in explosive environments require a totally enclosed motor. Yet another limitation relates to the effect of variations in line voltage. In single phase AC CSIR, CSCR motors, auxiliary winding voltage varies in direct proportion with variations of main winding or line voltage. That is, if line voltage changes by 10% there will be a 10% change in auxiliary winding voltage in the same direction at any given motor speed. A decrease in line voltage at any given motor speed also decreases motor torque. On the one hand, the vector sum of main and auxiliary winding voltages across the motor capacitors will increase at any given motor speed as main voltage increases.

Motors that employ a centrifugal switch to de-energize the auxiliary winding circuit at a single motor speed (cut-out speed) independent of main winding voltage levels are subject to the effects of variation in main winding voltage. Such variations result in the following undesirable effects:

under decreased main winding voltage conditions the auxiliary winding circuit is de-energized too early so that acceleration to full load speed on the main winding is prolonged and if the main winding torque is insufficient the motor may stall or not accelerate to full load speed causing excessive motor heating.

with increased main winding voltage conditions the auxiliary winding circuit is de-energized too late so that the vector sum of main and auxiliary winding voltage levels across the motor capacitors is increased substantially increasing the voltage stress on the motor capacitors reducing their long term reliability.

It is an object of the present invention to provide a starting system and method for a single phase induction motor which avoids the shortcomings and limitations of the prior art mentioned above.

Another object is the provision of a system and method which can be used with a wide range of motor ratings, for example, from a tenth of a horsepower up to five horsepower.

Yet another object of the invention is the provision of a starting system and method which can be used with motors as well as capacitor start induction run and capacitor start-capacitor run motors.

Another object is the provision of a system which is reliable and long lasting.

Various additional objects and advantages of the present invention will become apparent from the following detailed description and accompanying drawings.

SUMMARY OF THE INVENTION

Briefly, the above objects are realized by using a triac serially connected to the auxiliary winding of a single phase motor of any of a capacitor start induction run and capacitor start-capacitor run type, and controlling the conduction of the triac and concomitantly energization of the auxiliary winding in dependence upon the satisfaction of several conditions comprising:

1) the system supply voltage -VEE is greater than an initial fixed reference REF1 and remains within a fixed range;

2) AC line voltage V(LINE) is greater than an initial fixed reference REF2 and remains within a fixed range;

3) the auxiliary winding voltage V(START) is less than a programmable reference value V, or an appropriate signal has been applied to a reversing switch input; and 4) the sinusoidal voltage across the triac V(TRIAC) has crossed through zero and has not passed a fixed maximum value.

The system has three operating modes: RESET, START and RUN. A gate signal for the triac is generated in the START mode and is inhibited in the RESET and RUN modes.

According to a feature of the invention, the gate signal generator is mode programmable and can supply either a pulse for direct triac triggering or a continuous DC level for other processing circuitry, such as an optically coupled interface. The generator employs zero-voltage switching to reduce EMI. The gate signal current is programmable by means of an external resistor.

According to another feature of the invention the system allows the auxiliary winding cut-in and cut-out parameters to be calibrated for a wide variety of motors and provides a calibratable slope feature for maintaining optimum motor starting torque for varying line voltage conditions.

The system is in the START mode when conditions 1, 2 and 3 have been satisfied and will begin generating the gate signal when condition 4 is met and will continue generating the signal until V(START) exceeds the calibratable reference value $V_{co}$ causing the gate signal to be inhibited.

Disconnection of the motor's auxiliary winding reduces V(START) to some intermediate value between $V_{ci}$ and $V_{co}$ with the system in the RUN mode.

BRIEF DESCRIPTION OF THE DRAWINGS

In the accompanying drawings in which the preferred embodiments of the invention are shown.

Figure 1:
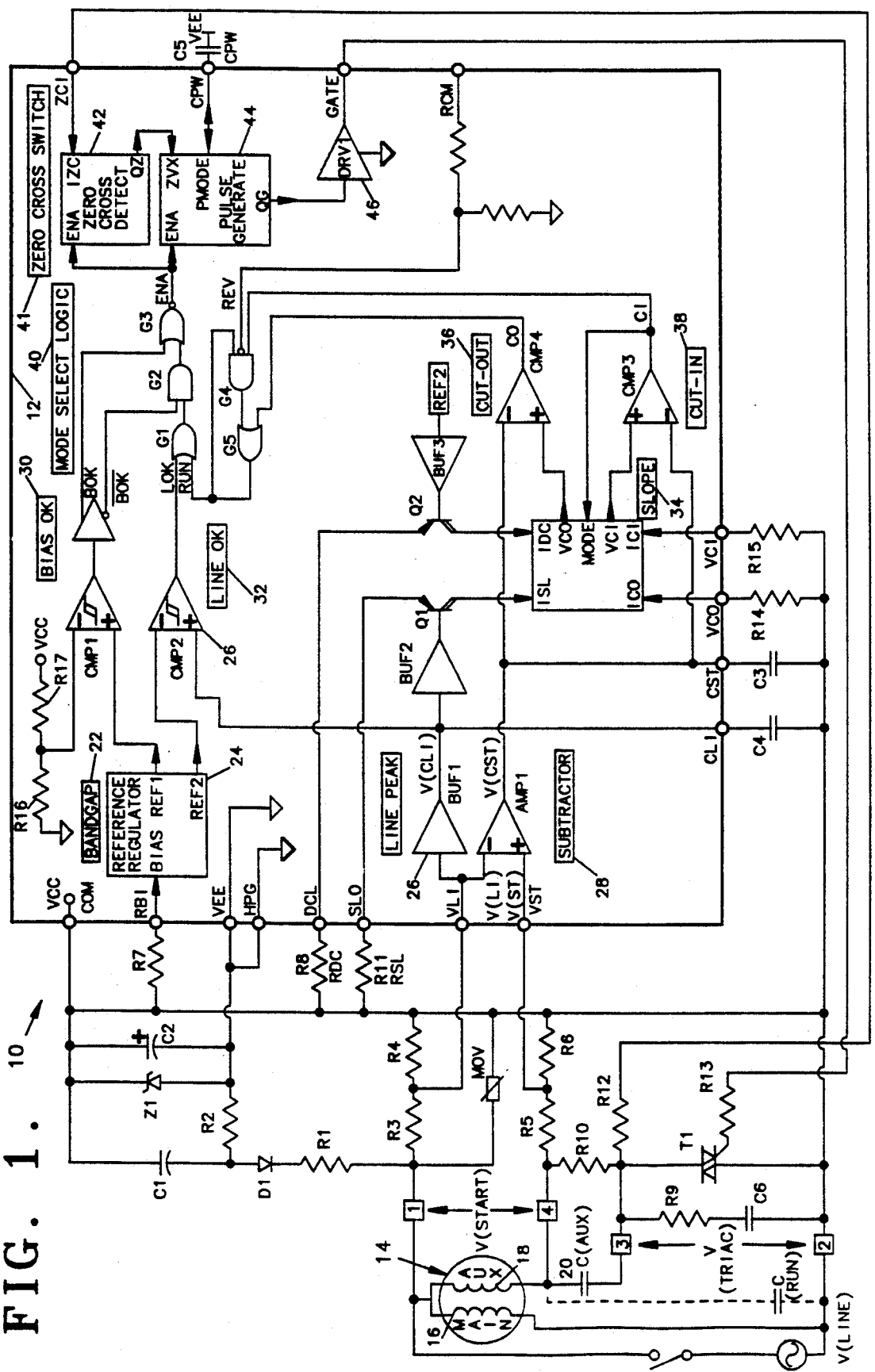
FIG. 1 is a block diagram of a system made in accordance with the invention shown with a CSIR motor.

The start switch system made in accordance with the invention controls the connection of a motor auxiliary winding to the AC line by providing a gate signal to a triac placed in series with the winding and a motor start capacitor. A gate signal is generated in the START mode and is inhibited in the RESET and RUN modes.

As mentioned above, the gate signal is generated when all of the following conditions are present in the order described:

1. Control circuit supply voltage −VEE is greater than a selected initial reference REF1 and remains within a fixed range. More specifically, when the power supply voltage VEE as determined by the BIAS OK section 30 becomes greater than −9 volts by way of example and stays above −6 volts;

2. AC line voltage V(LINE) is greater than an initial fixed reference REF2 and remains within a fixed range. That is, as determined by the LINE OK section 32 line voltage must be above 70 volts RMS by way of example before the triac can be turned on and must stay above 55 volts RMS before the triac is inhibited from being turned on;

3. The motor auxiliary winding voltage V(START) is less than a programmable reference value $V_{ci}$ or an appropriate signal has been applied to the RCM input to reverse the direction of rotation of the motor under certain conditions not relevant to the instant invention. With respect to the requirement that V(START) be less than the reference value this will prevent the triac from turning on in situations when, for example, the motor has been running at normal speed and then turned off and immediately re-energized;

4. The sinusoidal voltage V(TRIAC) has crossed through zero and has not passed a fixed maximum value as determined by the Zero Cross Detect section which receives a signal through pin ZCI from resistor R12.

5. In the run mode when motor loading decreases V(START) below $V_{ci}$ and conditions 1, 2 and 4 are met.

The system is in the RESET mode until the first and second conditions are established and the absence of either condition will cause the system to resume the RESET mode. The system goes into the START mode when all four conditions are met. The gate signal will continue to be generated until V(START) exceeds a programmable reference value $V_{co}$ causing the gate signal to be current falls below the triac's specified holding current thereby disconnecting the auxiliary winding from the AC line. As mentioned supra, application of a signal at pin RCM will cause the system to resume the start mode. Disconnection of the motor's auxiliary winding reduces V(START) to some intermediate value between $V_{ci}$ and $V_{co}$ with the system in the RUN mode. That is, when V(START) exceeds $V_{co}$ the triac is disabled and turns off.

With particular reference to FIG. 1 a motor start switching module 10 is shown comprising an integrated circuit 12 with associated externally mounted components adapted to control the energization of motor 14 having a main winding 16 and a parallel connected auxiliary winding 18. More specifically, the switching module 10 controls the connection of auxiliary winding 18 to the AC line by providing a gate signal to triac T1 placed in series with the auxiliary winding and a motor start capacitor 20.

The integrated circuit 12 comprises bandgap section 22 in the form of reference regulator 24, line peak detector section 26, subtractor section 28, bias OK section 30, line OK section 32, slope detection section 34, cut-out section 36, cut-in section 38, mode select logic section 40, zero cross switch 41 comprising zero cross detect section 42, pulse generator section 44 and driver section 46.

Module 10 is provided with terminals 1-4 with terminal 2 adapted for connection to common and terminal 1 for connection to the other side of line voltage. Terminal 3 is adapted for connection to the auxiliary winding circuit beyond motor start capacitor 20 and terminal 4 is adapted for connection between the auxiliary winding 18 and motor start capacitor 20.

The power supply comprises resistor R1 serially connected to diode D1 and capacitor C1 which is in turn connected to common, pin COM on IC 12. Resistor R2 is connected to a point between diode D1 and capacitor C1 and is connected in series with the parallel network of zener diode Z1 and capacitor C2. This constitutes a negative power supply, e.g., −11 volt DC supply, that is connected to IC 12 at pins VEE and HPG. −VEE is the negative power supply for the chip logic which draws about 5 milliamps DC while HPG supplies current to the triac driver which requires approximately 150 milliamps to be discussed below. The opposite side of the power supply connected to pin COM or VCC is the most positive point in the power supply and is connected to terminal 2.

Terminal 1 is connected to a voltage divider comprising resistors R3 and R4 in turn connected to common with the center tap of the divider connected to pin VLI to provide one half of an attenuated differential input signal for the start winding voltage and attenuated V(LINE) signal. Terminal 4, connected to the other side of the auxiliary winding, is also connected to a voltage divider comprising resistors R5 and R6 and connected to common with its center tap connected to pin VST. Thus, an attenuated differential start winding voltage can be measured between pins VLI and VST.

Resistor R10 is shown connected between terminal 4 and terminal 3 across capacitor 20 and serves as a bleeder resistor for the motor start capacitor if one is desired.

The main terminals of triac T1 are connected to terminals 3 and 2. Optionally, resistor R9 and capacitor C6 may be connected in parallel with triac T1 to serve as a snubber network for the triac. The gate of triac T1 is connected to pin GATE through current limiting resistor R13. The triac can be directly driven, as will be discussed below, using a pulse of 150 milliamps approximately 50 microseconds wide near the zero crossing. Alternatively, as will be discussed in relation to FIG. 2, during an OCI drive mode a steady DC current of up to 15 milliamps is provided through resistor R13.

Zero crossing sense resistor R12 is connected to the junction of resistors R9 and R10 to attenuate the voltage across the triac which is fed into pin ZCI of the zero cross switch section 42.

Resistor R8 is connected between pin DCL and common to set a steady state current to be discussed below. Resistor R11 is connected between pin SLO and common. Resistors R8 and R11 are adjusted to vary the slope of the motor speed cut-out relative to line voltage, i.e., the slope can be varied by changing the ratio between resistors R8 and R11.

Resistor R7 is coupled between common and pin RBI. A steady DC current is provided through resistor R7 to the bandgap section 22 setting the bias for the reference regulator 24.

Capacitor C4 is connected between pin CLI and common and serves as a filter or integration capacitor for line voltage signal. Capacitor C3, connected between pin CST and common is the filter or integration capacitor for the differentially measured start winding voltage signal.

Resistor R14 connected between pin VCO and common serves as the motor speed cut-out calibration resistor while resistor R15 connected between pin VCI and common serves as the motor speed cut-in calibration resistor. These resistors set voltage references for respective cut-out and cut-in comparators.

Capacitor C5 is shown connected between pin CPW and VEE to provide a pulse drive mode for the triac. When capacitor C5 is shorted out the OCI drive mode is effected providing constant current out of the GATE pin.

Integrated circuit 12 comprises Bandgap Reference Regulator 24 which provides stable voltage and current references against which the reset functions Bias OK 30 and Line OK 32 are compared as well as the reference input to buffer BUF3. Buffer BUF3, transistor Q2 and an external resistor R8 connected to pin DCL generate a current IDC proportional to reference REF2/resistor R8.

The Bias OK comparator CMP1 compares an attenuated portion of the −VEE voltage, i.e., the center tap of voltage divider comprising resistors R16, R17, against reference REF1 and provides complementary output signals $\overline{BOK}$ to AND gate G2 and BOK to NOR gate G3. Signal BOK will be false when −VEE is greater than reference REF1 and when −VEE remains within the hysteresis band of comparator CMP1.

The Line Peak buffer BUF1 peak detects voltage V(LI) prescaled or attenuated by resistors R3 and R4 and stores the resultant half-wave rectified peak voltage on capacitor C4 connected to pin CLI. The output voltage V(CLI) is applied to the input of buffer BUF2 and to the non-inverting input of Line OK comparator CMP2. Buffer BUF2, transistor Q1 and resistor R11 generate a current ISL proportional to V(CLI)/resistor R11.

The Line OK comparator CMP2 compares the voltage V(CLI) with reference REF2 and provides a signal LOK to OR gate G1. Thus the signal from buffer BUF1 filtered by capacitor C4, representing line voltage, is compared to REF2 voltage so that if the line voltage is above a selected level, e.g., 70 volts RMS, voltage V(CLI) will be higher than the reference voltage in comparator CMP2 resulting in a Line OK true signal that feeds into OR gate G1. If the line voltage drops below a selected level, e.g., 55 volts RMS, the triac will be inhibited and the system will go back to the RESET mode. Signal LOK will be false when V(CLI) is less than reference REF2 and when V(CLI) remains within the hysteresis band of comparator CMP2.

Subtractor amplifier AMP1 processes as phasors the voltage V(LI) and the voltage V(ST) prescaled by resistors R5 and R6 and stores the resultant half-wave rectified peak difference voltage V(CST) on capacitor C3 connected to pin CST. The voltage V(CST) is applied to the inverting input of cut-out and cut-in comparators CMP4 and CMP3 respectively as the processed V(START) envelope voltage. The negative input of subtractor amplifier AMP1 receives the attenuated line voltage signal V(LI) while the positive input receives the attenuated start winding voltage signal V(ST) taken from the junction of resistors R5 and R6. The two signals are subtracted and the peak differences are half-wave rectified and filtered by capacitor C3 and applied to the inverting inputs of comparators CMP3 and CMP4. It should be noted that the input scaling resistor relationships R4=R6 and R3=R5 must be maintained for proper subtractor operation.

The slope algorithm generator 34 combines the IDC and ISL currents according to the state of the generator's MODE input fed from the output of cut-in comparator CMP3. When the system is in the START mode, current ICO is proportional to $\frac{1}{4}$ (IDC+ISL). When the system is in the RUN mode, current ICI is proportional to $\frac{1}{4}$ (IDC+ISL). Resistor R14 and current ICO generate the $V_{co}$ voltage applied to the non-inverting input of cut-out comparator CMP4. Resistor R15 and current ICI generate the cut-in voltage $V_{ci}$ applied to the non-inverting input of comparator CMP3. By adjusting the ratio of resistors R8 and R11 the cut-out slope can be adjusted to be negative or positive as desired.

Cut-out comparator CMP4 compares the voltages V(CST) and $V_{co}$ and generate the signal CO applied to one input of OR gate G5. Signal CO is true when V(CST) is greater than $V_{co}$. Thus comparator CMP4 compares the voltages V(CST) coming out of Subtractor section 28 with $V_{co}$, the signal coming out of the Slope Algorithm Generator 34 and when V(CST) is greater than the reference the output signal CO from comparator CMP4 is fed into the Mode Select Logic 40, gate G5 to thereby inhibit the triac from operating.

The cut-in comparator CMP3 compares the voltage V(CST) and $V_{ci}$ and generates the signal CI applied to the algorithm generator's MODE input and applied to one input of AND gate G4. Signal CI is true when V(CST) is less than $V_{ci}$. The cut-in comparator CMP3 compares the voltage V(CST) from Subtractor section 28 with voltage $V_{ci}$ from Slope Algorithm Generator 34 and its output voltage CI is fed into Mode Select Logic 40 at gate G4. If V(CST) drops below the reference comparator CMP3 will switch thereby enabling the triac to turn on.

Mode select logic 40 comprising gates G1–G5 determines the modes of the system and provides the ENA signal to the Zero Cross Detect section 42 and Pulse Generate section 44. Signal ENA is true in the START mode. It is necessary for the enable signal ENA at the Zero Crossing Detect section 42 and the Pulse Generate section 44 to result in a pulse or, if in the OCI mode, a continuous current of 15 milliamps DC.

The configuration of the cut-in and cut-out comparators and the Mode Select Logic is such that in the START mode the cut-out comparator has exclusive control of the Zero Cross Switch while the cut-in comparator has exclusive control when in the RUN mode. That is, when in the START mode, the cut-out comparator controls the enable signal (along with the Bias OK and Line OK) and when in the RUN mode the cut-in comparator controls the enable signal.

A stated supra, the Zero Cross Switch 41 comprises the Zero Cross Detect section 42, Pulse Generate section 44 and Driver DRV1 section 46. The Pulse Generate section produces the triac gate signal when the ENA and ZVX signals are true.

The Zero Cross Detect section 42 compares the input current IZC, the signal generated from resistor R12, against several fixed reference currents. Current IZC is proportional to V(TRIAC)/resistor R12. Section 42 generates a QZ signal which is true when the ENA input is true and IZC has crossed through zero and is increasing positive or increasing negative and has not passed a fixed maximum value. The zero crossing threshold can be adjusted by adjusting the value of resistor R12.

Pulse Generator section 44 generates the QG signal when the ENA input is true and the zero voltage crossing ZVX signal is true. The signal will be a continuous DC level if −VEE is applied to the PMODE input or the signal will be a pulse of a width proportional to capacitor C5–CPW * $V_{pw}/I_{pw}$ if capacitor C5 is present at the PMODE input. Thus, if capacitor C5 is present pulse triggering will be obtained and if it is shorted out a direct drive level will be obtained as long as the enable signal ENA is present and signal QZ has been applied to ZVX at least once while ENA is present.

Drive DRV1 section 46 generates the GATE signal when the QG signal is true. Resistor R13 programs the triac gate drive current. The driver DRV1 is powered from the HPG pin (high powered ground input).

Figure 3:
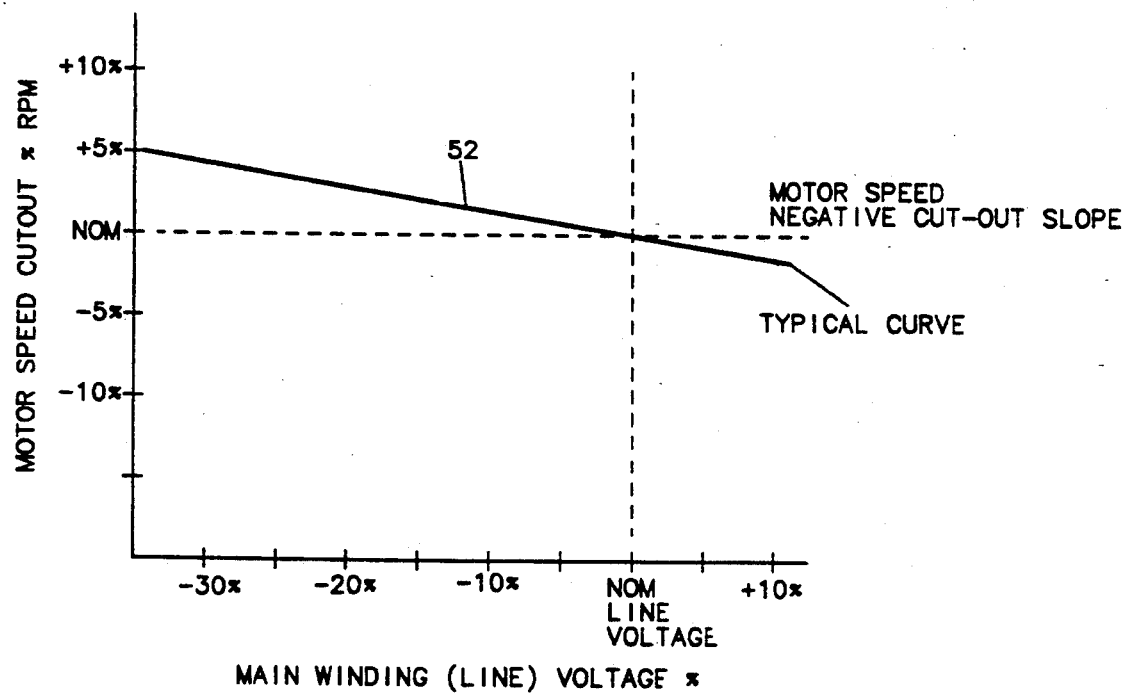
FIG. 3 is a graph showing motor speed cut-out % RPM vs main winding or line voltage.

The slope of the motor speed cut-out (% RPM) versus main winding (line voltage) can be adjusted by varying the values of resistors R8 and R11, as mentioned above. As seen in FIG. 3, a negative motor speed cut-out slope is effective to offset or even eliminate undesirable effects of variations in line voltage which would occur if a mechanical centrifugal auxiliary winding switch were used. That is, with a negative slope curve 52 the motor cut-out speed is increased when the line voltage decreases and decreases when the line voltage increases. At reduced line voltage the motor speed cut-out point is increased allowing increased starting torque before the auxiliary winding switch is opened de-energizing the auxiliary winding. When line voltage increases above nominal the motor speed point is decreased thereby reducing motor capacitor voltage stress levels and concomitantly enhancing their reliability.

Figure 2:
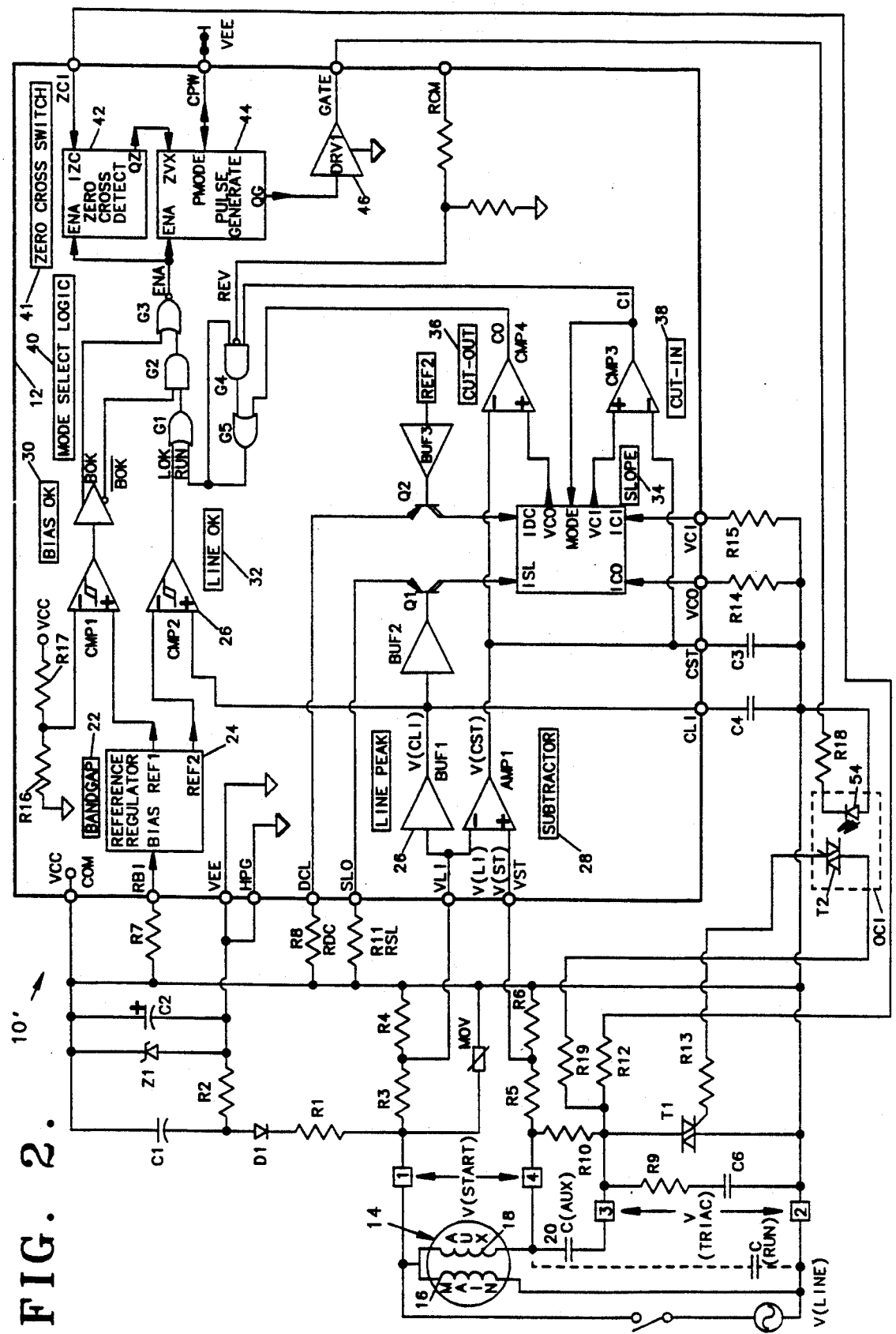
FIG. 2 is a schematic circuit diagram of a modification of the FIG. 1 system.

With reference to FIG. 2 which shows module 10' in the OCI mode, that is when capacitor C5 is shorted and the supply voltage is connected directly to the CPW pin, a level current of up to 15 milliamps DC is provided from the gate pin through LED 54. When the LED is energized it will turn on optical coupled interface triac T2 which then supplies the gate signal to triac T1 turning it on and energizing the auxiliary winding. In this mode the zero cross detect section 42 must sense a ZVX signal before continuous drive current is initiated. This modification is particularly useful when electrical isolation is desired between the output and input circuitry. For higher rated motors two high current inverse parallel connected SCR's can be employed instead of triac T1, for example, at current ratings above approximately 40 amps. Since the remainder of the circuit is the same as for the FIG. 1 embodiment the description of that portion need not be repeated.

The following table lists components used in making a system in accordance with FIG. 1 and FIG. 2 of the invention:

| Part Description | Part # | Description |
| --- | --- | --- |
| 12 | CS4017 | IC |
| T1 | 15–40 AMP, 600–800V | Triac |
| MOV | 130–150VAC | Varistor |
| Z1 | IN962B, 11VDC 500MW | Zener Diode |
| C1 | 47 MFD, 50VDC | Capacitor |
| C2 | 6.8 MFD, 50VDC | Capacitor |
| C3 | .1 MFD, 50VDC | Capacitor |
| C4 | .1 MFD, 50VDC | Capacitor |
| C5 | .0018 MFD, 50VDC | Capacitor |
| C6 | .01 MFD, 630VDC | Capacitor |
| R1 | 3W, 3.9K OHM, 5% | Resistor |
| R2 | 1/4W, 100 OHM, 5% | Resistor |
| R3 | 1/4W, 576K OHM, 1% | Resistor |
| R4 | 1/4W, 7.15K OHM, 1% | Resistor |
| R5 | 1/4W, 576K OHM, 1% | Resistor |
| R6 | 1/4W, 7.15 OHM, 1% | Resistor |
| R7 | 1/4W, 30.1K OHM, 1% | Resistor |
| R8 | 1/4W, 1K-1 MEG OHM, 1% | Resistor |
| R9 | 1/4W, 39 OHM, 5% | Resistor |
| R10 | 3W, 15K OHM, 5% | Resistor |
| R11 | 1/4W, 1K-1 MEG OHM, 1% | Resistor |
| R12 | 1/4W, 10K-2 MEG OHM, 5% | Resistor |
| R13 | 1/4W, 1.0-10K OHM, 5% | Resistor |
| R14 | 1/4W, 1K-1 MEG OHM, 1% | Resistor |
| R15 | 1/4W, 1K-1 MEG OHM, 1% | Resistor |
| D1 | IN4007, 1 AMP, 1000 VOLT | Diode |
| R18 | 1/4W, 10-10K OHM, 5% | Resistor |
| R19 | 1/4W, 10-2K OHM, 5% | Resistor |
| OCI | 1-30 mA IFT | Optical Coupled Interface, Triac Output |

As described above the apparatus and method of the instant invention differentially measures the auxiliary winding voltage and by so doing triac T1 can conveniently be directly triggered by the apparatus thereby obviating a need for a relatively expensive OCI device.

The feature of the adjustability of the ratio of resistors R8 and R11 to provide a selected negative or positive cut-out slope enables the apparatus to be used in a wide number of applications. Although a negative slope will be desired for many applications there are occasions where a positive slope is called for. For example, when used with starting motors in certain intermittent or temporary duty applications a positive cut-out slope will prevent motor burn out at reduced line voltage levels.

The feature of being able to adjust the triac ZVX level results in an advantage that with pulse gating the gate pulse can occur at levels above the zero crossing which allows a shorter gate pulse to turn the triac on thereby saving supply power costs. This is particularly useful with large motors that are large inductive loads in which, on the initial triac turn on the triac anode current is slow to rise above the minimum latching current. By gating the triac at a level greater than 0 volts the anode current rise of the triac is greater which means that the triac gate pulse can be shorter thus reducing power supply requirements and cost.

Still another advantage provided by the apparatus and method of the invention compared to prior art centrifugal switches is that by monitoring line voltage the possibility of regeneration is obviated. That is, after AC power turn off whenever V(MAIN) decreases below a selected level, i.e., approximately 55 VAC, the triac will be inhibited from turning on.

An advantage provided by monitoring −VEE (BOK) is that sufficient voltage for proper operation of the IC and triac triggering is assured.

Although the invention has been described with respect to specific, preferred embodiments thereof, many variations and modifications will become apparent to those skilled in the art. It is the intent that the appended claims be interpreted as broadly as possible, in view of the prior art to include all such variations and modifications.

What is claimed is:

1. A system for starting one of a capacitor start induction run and capacitor start-capacitor run motor having a main winding and an auxiliary winding comprising:

a triac having a gate and having first and second main terminals connected in series with the auxiliary winding to control the energization thereof, control apparatus comprising;

a power supply means for providing first DC control circuit supply and second line voltage reference voltages, bias OK means to compare supply voltage to the first reference voltage, a first condition being satisfied when the supply voltage exceeds the first reference voltage, line OK means to compare line voltage to the second reference voltage, a second condition being satisfied when the line voltage exceeds the second reference voltage, cut-in voltage means to compare start winding voltage to a selected cut-in level, a third condition being satisfied when the start winding voltage is less then the cut-in level, zero crossing detection means to detect the crossing through zero of a sinusoidal voltage across the triac and, with the other three conditions being satisfied, to generate an enable signal when the sinusoidal voltage has cross zero and is below a selected maximum; and, means to turn on the triac in response to the enable signal.

2. A system according to claim 1 in which the means to turn on the triac in response to the enable signal comprises a pulse generating means coupled to the gate of the triac.

3. A system according to claim 2 in which the pulse generating means includes a mode input, the pulse generating means providing a continuous DC level output when the power supply in coupled directly to the mode input.

4. A system according to claim 2 in which the pulse generating means includes a mode input and further includes a capacitor, the pulse generating means providing a pulse when the capacitor is coupled to the mode input.

5. A system according to claim 1 further including a cut-out comparator and a cut-in comparator, the cut-out and cut-in comparators each having an output coupled to mode select logic means, means to compare start winding voltage with selected reference voltages in each of the cut-out and cut-in comparators.

6. A system according to claim 5 further including a slope algorithm generator having a mode input, a first current input, a second current input, a third current input, a fourth current input, a cut-out voltage output coupled to the cut-out comparator and a cut-in voltage output coupled to the cut-in comparator, means connected to the first current input to generate a first current including a first resistor, means connected to the second current input to generate a second current including a second resistor, means connected to the third current input to generate a third current including a third resistor, means connected to the fourth current input to generate a fourth current including a fourth resistor, the output of the cut-in comparator being coupled to the mode input, the algorithm generator combining the first and second currents according to the state of the mode input.

7. A system according to claim 6 in which the third current is proportional to ½ of the first plus the second currents when the four conditions are satisfied, the third current and the third resistor generating the cut-out voltage output applied to the cut-out comparator.

8. A system according to claim 6 in which the fourth current is proportional to ½ of the first plus the second currents, the fourth current and the fourth resistor generating the cut-in voltage output applied to the cut-in comparator.

9. A method for starting one of a capacitor start induction run and capacitor start-capacitor run motors having a main winding and an auxiliary winding with a triac serially connected to the auxiliary winding to control the energization thereof, comprising the steps of:

differentially measuring the start winding voltage, determining the resultant difference voltage between the lines and start winding voltages, applying the resultant voltage to a cut-out comparator means, and to a cut-in comparator means, generating a first current through a first resistor, generating a second current through a second resistor, combining the first current and the second IDC current, generating a third current through a third resistor proportional to ½ of the first plus the second currents, generating a fourth current through a fourth resistor proportional to ½ of the first plus the second current, generating a cut-out voltage through the third resistor and the third current and applying it to the cut-out comparator means, generating a cut-in voltage through the fourth resistor and the fourth current and applying it to the cut-in comparator means, coupling the output of the cut-out and cut-in comparator to mode logic means; and producing a signal to turn on the triac in response to the output of the logic means.

10. A method according to claim 9 including the step of adjusting the motor cut-out voltage by varying the value of the third resistor.

11. A method according to claim 9 including the step of adjusting the motor cut-in voltage by varying the value of the fourth resistor.

12. A method according to claim 9 including the step of adjusting the slope of line voltage versus cut-out voltage by varying the values of the first and second resistors.

13. A method for starting an electric motor having a main winding and an auxiliary winding with a gated solid state switch connected to the auxiliary winding to control the energization thereof comprising the steps of generating signals proportional to a line and start winding voltages, applying gate current to the gated solid state switch when energizing the motor, providing a selected slope of line voltage versus cut-out voltage and interrupting the gate current when the start winding voltage has reached a selected cut-out value relative to line voltage.

14. A method according to claim 13 in which the slope is negative.

15. A method according to claim 13 in which the slope is positive.

* * * * *